United States Patent
Mori

(10) Patent No.: US 11,938,938 B2
(45) Date of Patent: Mar. 26, 2024

(54) TIRE NOISE TEST METHOD, VEHICLE AND CONTROL DEVICE

(71) Applicant: BRIDGESTONE CORPORATION, Tokyo (JP)

(72) Inventor: Ryosuke Mori, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 636 days.

(21) Appl. No.: 17/257,058

(22) PCT Filed: Jul. 2, 2019

(86) PCT No.: PCT/JP2019/026343
§ 371 (c)(1),
(2) Date: Dec. 30, 2020

(87) PCT Pub. No.: WO2020/009120
PCT Pub. Date: Jan. 9, 2020

(65) Prior Publication Data
US 2021/0179109 A1  Jun. 17, 2021

(30) Foreign Application Priority Data
Jul. 3, 2018 (JP) .................................. 2018-127058

(51) Int. Cl.
*B60W 30/18* (2012.01)
*B60W 30/09* (2012.01)
(Continued)

(52) U.S. Cl.
CPC ...... *B60W 30/18072* (2013.01); *B60W 30/09* (2013.01); *G01M 17/025* (2013.01);
(Continued)

(58) Field of Classification Search
CPC ........... B60W 30/18072; B60W 30/09; B60W 2030/1809; B60W 2520/10;
(Continued)

(56) References Cited

U.S. PATENT DOCUMENTS 10,013,819 B2   7/2018  Sugihara
2016/0349751 A1  12/2016  Sugimoto
(Continued)

FOREIGN PATENT DOCUMENTS

CN   101762319 A   6/2010
CN   204043930 U  12/2014
(Continued)

OTHER PUBLICATIONS

English Translation of CN 104417283 A Author: Kishida et al. Title: Pneumatic Tire Date: Mar. 18, 2015 (Year: 2015).*
(Continued)

*Primary Examiner* — Brian P Sweeney
*Assistant Examiner* — Steven Vu Nguyen
(74) *Attorney, Agent, or Firm* — Sughrue Mion, PLLC

(57) ABSTRACT

A tire noise testing method, a vehicle and a control device that are efficient in an actual vehicle noise test. The method of the invention is conducted while a vehicle is driven automatically. The method includes a step of operating a control unit when the vehicle reaches a predetermined position or reaches a predetermined speed, for putting the vehicle into coast-traveling with a prime mover of the vehicle in a non-driving state. The method further includes a step of operating a measuring unit for measuring the tire noise of the vehicle during the coast-traveling of the vehicle.

13 Claims, 9 Drawing Sheets

(51) Int. Cl.
*G01M 17/02* (2006.01)
*G07C 5/08* (2006.01)

(52) U.S. Cl.
CPC . *B60W 2030/1809* (2013.01); *B60W 2520/10* (2013.01); *B60W 2530/20* (2013.01); *B60W 2710/18* (2013.01); *B60W 2720/106* (2013.01); *G07C 5/0808* (2013.01)

(58) Field of Classification Search
CPC ......... B60W 2530/20; B60W 2710/18; B60W 2720/106; G01M 17/025; G07C 5/0808
See application file for complete search history.

(56) References Cited

U.S. PATENT DOCUMENTS

| | | | |
|---|---|---|---|
| 2017/0169629 A1 | 6/2017 | Sugihara | |
| 2018/0040176 A1 | 2/2018 | Ogawa et al. | |
| 2018/0237031 A1* | 8/2018 | Imai | B60W 50/082 |
| 2018/0326990 A1* | 11/2018 | Kusaka | B60W 10/18 |

FOREIGN PATENT DOCUMENTS

| | | |
|---|---|---|
| CN | 105181113 A | 12/2015 |
| CN | 106184217 A | 12/2016 |
| CN | 106468592 A | 3/2017 |
| JP | 2002-090264 A | 3/2002 |
| JP | 2005-043181 A | 2/2005 |
| JP | 2013-092452 A | 5/2013 |
| JP | 2013-134213 A | 7/2013 |
| JP | 2014-32087 A | 2/2014 |
| JP | 2017-20961 A | 1/2017 |
| JP | 2017-111116 A | 6/2017 |
| JP | 2018-025539 A | 2/2018 |
| KR | 2002-0039735 A | 5/2002 |
| WO | 2016/051585 A1 | 4/2016 |

OTHER PUBLICATIONS

English Translation of JP 2018025539 A Author: Ogawa et al. Title: Vehicle Test System, Program for Vehicle Test System, Vehicle Test Method, and Travel Resistance Setting Device Date: Feb. 15, 2018 (Year: 2018).*

English Translation of JP 2018043742 A Author: Watanabe et al. Title: Automatic Brake Control Method Date: Mar. 22, 2018 (Year: 2018).*

English Translation of CN107867126A Author: Okagawa et al. Title: Tire Date: Apr. 3, 2018 (Year: 2018).*

International Preliminary Report on Patentability dated Jan. 5, 2021 from the International Bureau in International Application No. PCT/JP2019/026343.

Search Report dated Jun. 8, 2022 from the China National Intellectual Property Administration in CN Application No. 201980043629.5.

Extended European Search Report dated Feb. 3, 2022 in European Application No. 19830647.4.

UN-R17-02-S08, Regulation No. 117, Uniform provisions concerning the approval of tyres with regard to rolling sound emissions and/or to adhesion on wet surfaces and/or to rolling resistance, Jan. 20, 2016.

International Search Report for PCT/JP2019/026343 dated Sep. 17, 2019.

* cited by examiner

TIRE NOISE TEST METHOD, VEHICLE AND CONTROL DEVICE

CROSS-REFERENCE TO RELATED APPLICATIONS

This application is a National Stage of International Application No. PCT/JP2019/026343 filed Jul. 2, 2019, which claims priority under U.S.C. § 119(a) to Japanese Patent Application No. JP2018-127058 filed on Jul. 3, 2018.

TECHNICAL FIELD

The invention relates to a tire noise test method, a vehicle and a control device. This application claims priority from Japanese Patent Application No. 2018-127058 filed in Japan on Jul. 3, 2018. The entire disclosure of this earlier application is herein incorporated by reference.

BACKGROUND ART

Conventionally, a tire noise test method is classified into two categories, i.e., a bench noise test and an actual vehicle noise test. In the bench noise test, as described in Patent Document 1, for example, a simulated road surface of the drum is brought into contact with the tire, and the noise generated by the tire is measured while the drum is being rotated. On the other hand, in the actual vehicle noise test, the noise generated by the tires is measured while the vehicle is put into actually travelling.

PRIOR ART DOCUMENT

Patent Document 1: JP2013-134213A

SUMMARY OF THE INVENTION

Problem

In the case of an actual vehicle noise test, since the vehicle is put into actual driving, it is possible to acquire more realistic tire noise data than the bench noise test. However, the conventional actual vehicle noise test involves a problem of inefficiency due to the necessity for involvement of a human driver for driving the vehicle.

It is therefore an object of the invention to provide a tire noise test method, a vehicle and a control device that are efficient in actual vehicle noise test.

Solution

The characteristic features of the invention are as follows.
According to one aspect of the invention, there is provided a tire noise test method to be conducted while a vehicle is travelling automatically, comprising steps of:
operating a control unit when the vehicle reaches a predetermined position or reaches a predetermined speed, for putting the vehicle into coast-traveling with a prime mover of the vehicle in a non-driving state; and
operating a measuring unit for measuring the tire noise during the coast-traveling of the vehicle.
According to another aspect of the present invention, there is provided a vehicle adapted for conducting a tire noise test during an automatic driving of the vehicle, comprising:
a prime mover; and
a control unit adapted to be operated, when the vehicle reaches a predetermined position or reaches a predetermined speed, for putting the vehicle into coast-traveling with the prime mover in a non-driving state.
According to still another aspect of the invention, there is provided a control device for automatically driving a vehicle and carrying out a tire noise test, wherein:
the control device is operated when the vehicle reaches a predetermined position or reaches a predetermined speed, for putting the vehicle into coast-traveling with a prime mover of the vehicle in a non-driving state.

Technical Effect

In accordance with the invention, it is possible to provide a tire noise test method, a vehicle and a control device that are efficient in an actual vehicle noise test.

EMBODIMENTS OF THE INVENTION

Figure 1:
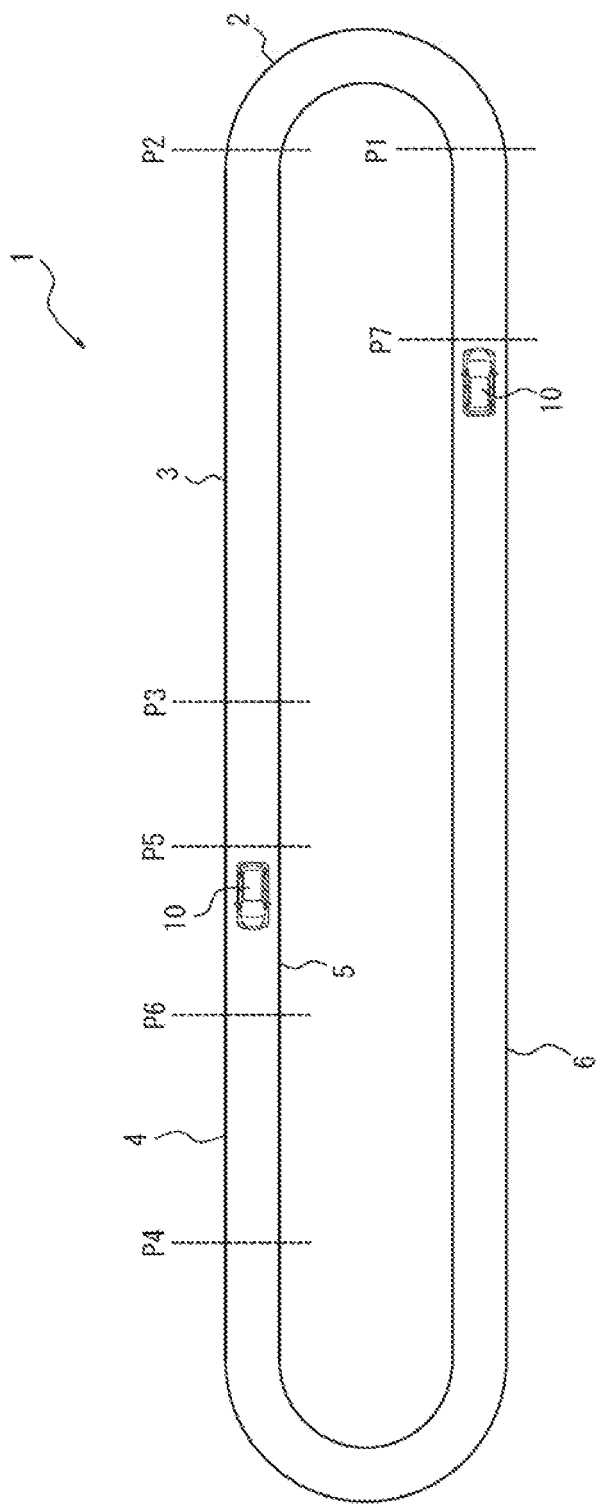
FIG. 1 is a plan view showing an example of the test course in the tire noise test method according to one embodiment of the invention.
Figure 2:
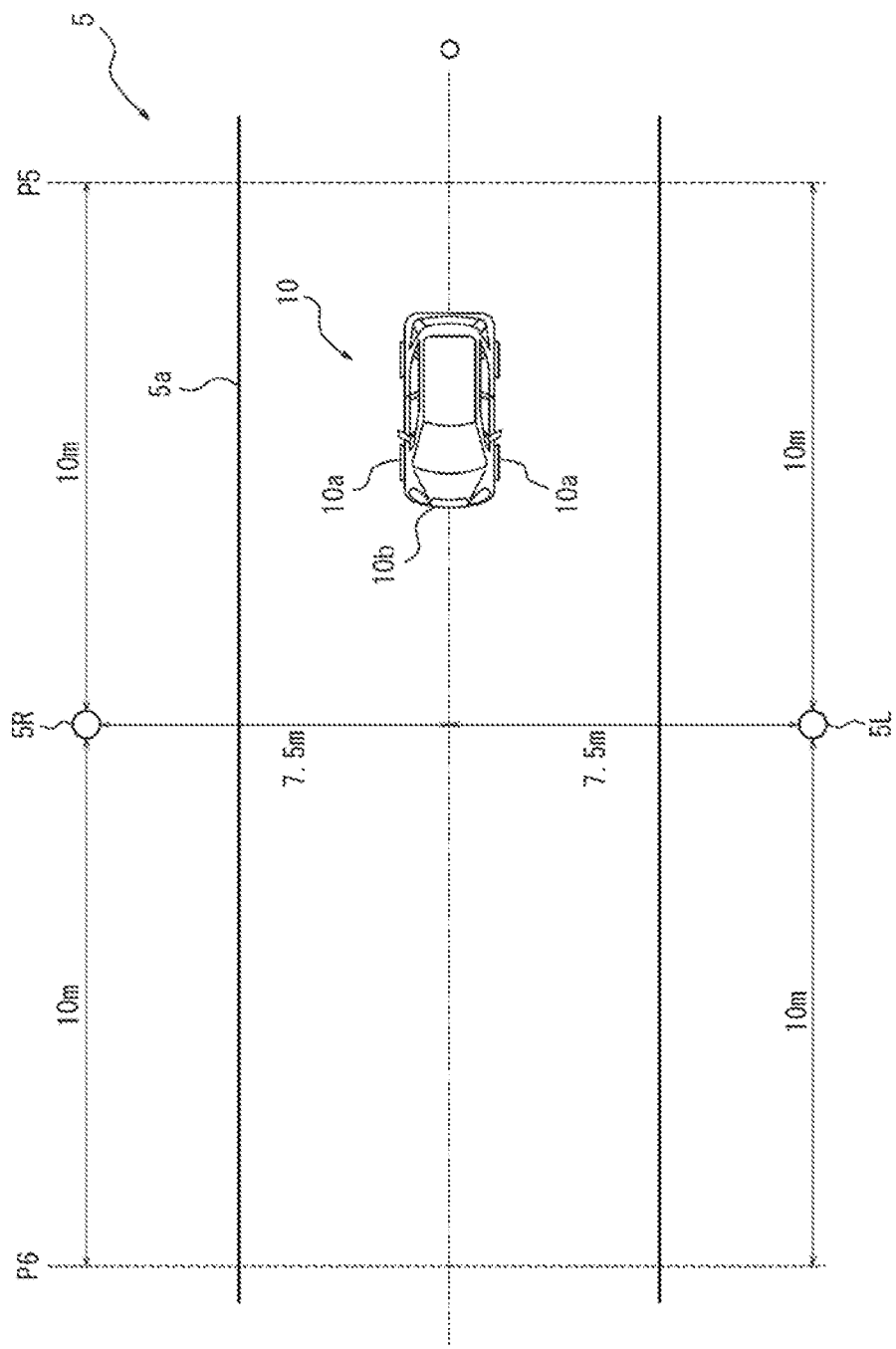
FIG. 2 is a plan view showing the measurement zone shown in FIG. 1.
Figure 4:
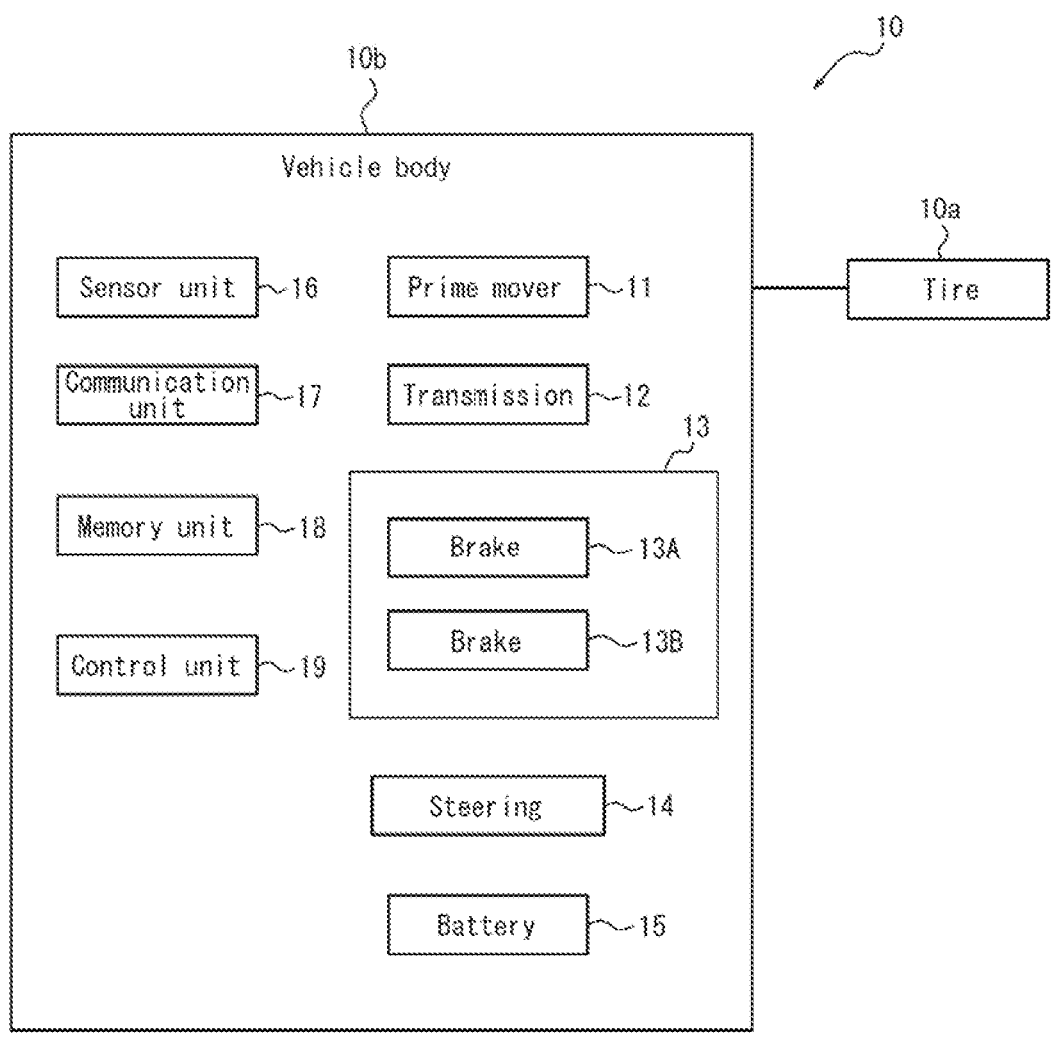
FIG. 4 is a block diagram showing an example of the vehicle for use in the tire noise test method according to one embodiment of the invention.

Embodiments of the invention will be described below with reference to the drawings.
(Outline of the Test Course)
FIG. 1 is a plan view showing an example of a test course 1 in the tire noise test method according to an embodiment of the present invention. FIG. 2 is a plan view of a measuring zone 5 shown in FIG. 1. In the present disclosure, the terms "right side" and "left side" refer to the right side and the left side, respectively, as seen from the vehicle 10 shown in FIG. 1.
The test course 1 shown in FIG. 1 is used for an actual vehicle noise test. In the actual vehicle noise test, the vehicle 10 travels round the test course 1, for example, in a counterclockwise direction. As shown in FIG. 2, the vehicle 10 includes a tire 10a to be subjected to a noise test, and a vehicle body 10b to which the tire 10a is attached. The vehicle 10 is adapted to be driven automatically. In the present disclosure, the term "automatic driving" means the state of the vehicle 10 travelling under the control by a control device or the like (for example, a control unit 19 or an external device as shown in FIG. 4 to be described later) for controlling acceleration, steering and control of the vehicle 10 without human involvement. For example, the vehicle 10 is autonomously driven at level 4 of automation as defined by the MLIT (Ministry of Land, Infrastructure, Transport and Tourism) in Japan.

As shown in FIG. 1, the test course 1 may be an oval track including straight and corner sections. The test course 1 shown in FIG. 1 includes a speed maintenance zone 2, an acceleration zone 3, a coast-traveling zone 4, and a cruising zone 6.

The speed maintenance zone 2 has a position P1 as the start point and a position P2 as the end point, as shown in FIG. 1. The speed maintenance zone 2 includes a corner section. Further, the speed maintenance zone 2 is provided with an inclination angle (bank). In the speed maintenance zone 2, the vehicle 10 travels the outer side of the corner in the speed maintenance zone 2 and travels by utilizing the centrifugal force to maintain a constant speed (e.g., 60 km/h).

The acceleration zone 3 starts at the position P2 and ends at a position P3, as shown in FIG. 1. The acceleration zone 3 includes a straight section. In the acceleration zone 3, the vehicle 10 accelerates and travels, for example, at a predetermined acceleration rate.

The coast-traveling zone 4 has the position P3 as a start point and a position P4 as an end point, as shown in FIG. 1. The coast-traveling zone 4 includes a straight section. The coast-traveling zone 4 further includes a measuring zone 5 as shown in FIG. 1.

As shown in FIG. 1, the measuring zone 5 has a position P5 as the start point and a position P6 as the end point. In the measuring zone 5, the noise generated by the tire 10a of the vehicle 10 shown in FIG. 2 is measured. The measuring zone 5 is provided, as shown in FIG. 2, with measuring devices 5R and 5L. The measuring devices 5R and 5L are located on both sides in the width direction of the road surface 5a. The measuring devices 5R and 5L are, for example, microphones capable of collecting the noise of the tire 10a. The lengths of the measuring zone 5, i.e., the distance from the position P5 to the position P6, and the location of the measuring devices 5R and 5L, are appropriately set based, for example, on suitable tire noise test standards.

For example, in the tire noise test defined by ECE R117, as shown in FIG. 2, the length of the measuring zone 5 is set to be 20 m. The measuring devices 5R and 5L are arranged in the center of the measuring zone 5. The measuring devices 5R and 5L are arranged at a height 1.2 m from the road surface 5a. In addition, the measuring device 5R is installed at a position 7.5 m to the right of the widthwise center line O of the road surface 5a of the measuring zone 5. The measuring device 5L, in turn, is installed at a position 7.5 m to the left of the widthwise center line O of the road surface 5a of the measuring zone 5. The measuring devices 5R and 5L are adopted to collect noise generated by the tire 10a of the vehicle 10 on the right side and the left side of the vehicle 10, respectively.

Here, by the time the vehicle 10 reaches the position P3 which is the starting point of the coast-traveling zone 4, the prime mover of the vehicle 10 is put into a non-driving state. By putting the prime mover of the vehicle 10 to the non-driving state by the time the vehicle 10 reaches the position P3, the noise of the vehicle 10 generated other than the tire 10a is reduced in the measuring zone 5. Under such control, the measuring devices 5R and 5L shown in FIG. 2 can accurately collect the noise generated by the tire 10a.

The cruising zone 6 shown in FIG. 1 has a start point at the position P4, and an end point at the position P1. The cruising zone 6 includes a straight section and a corner section. In the cruising zone 6, the vehicle 10 puts the prime mover of the vehicle 10 into the driving state again. The vehicle 10 may travel along the cruising zone 6 at any appropriate speed.

The cruising zone 6 includes a position P7. The position P7 is a standby position for other vehicles 10, when there are two or more vehicles 10 on the test course 1.

While the vehicle 10 is traveling along the cruising zone 6, the measuring devices 5R and 5L shown in FIG. 2 may collect background noise. The background noise is the noise other than that generated by the tire 10a to be measured. The background noise mainly includes the noise generated in the surrounding environment of the test course 1.

If the background noise is greater than a predetermined value, the test may be discontinued.

(Outline of the Test)

Figure 3:
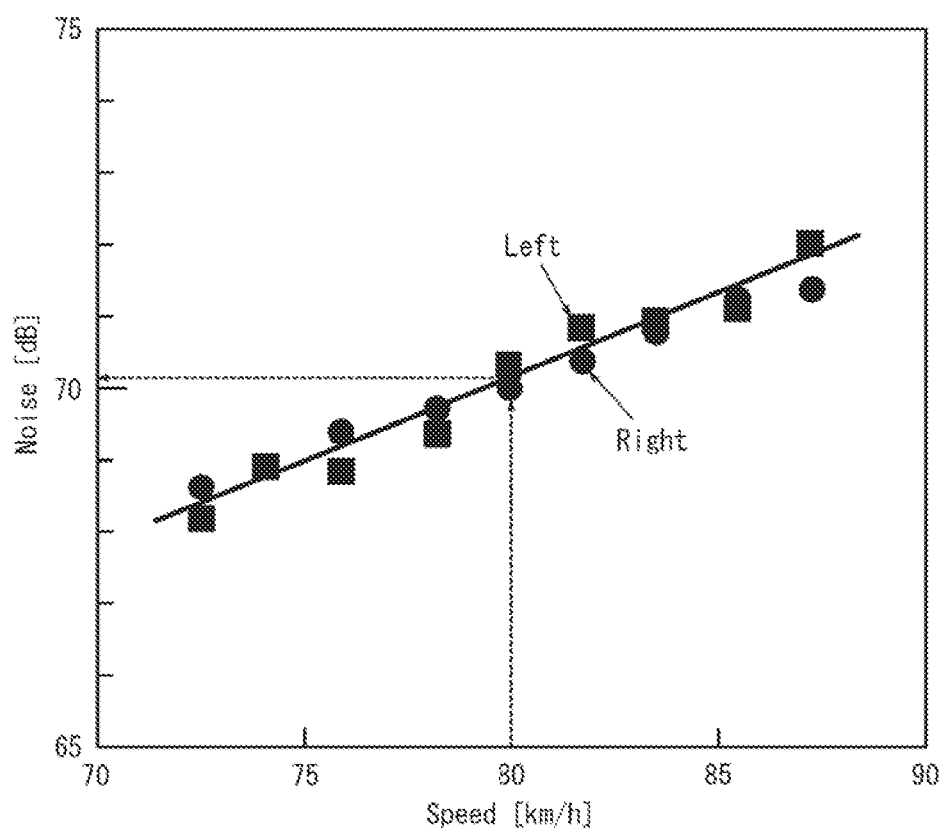
FIG. 3 is a graph showing an example of the measurement results of the tire noise in the tire noise test method according to one embodiment of the invention.

FIG. 3 is a graph showing an example of tire noise measurement results in the tire noise test method according to the embodiment of the present invention. In FIG. 3, the abscissa represents the speed of the vehicle 10, while the ordinate represents the noise generated by the tire 10a.

FIG. 3 shows an example of measuring the noise of the tire 10a when the reference speed is 80 km/h. The plots "Left" shown in FIG. 3 are the data collected by the measuring device 5L shown in FIG. 2. Similarly, the plots "Right" shown in FIG. 3 are the data collected by the measuring device 5R shown in FIG. 2.

For example, in the tire noise test according to ECE R117, the noise of the tire 10a when the vehicle 10 is travelling along the measuring zone 5 is measured at nine different speeds within the range of the reference speed ±10 km/h. If the reference speed is 80 km/h, as shown in FIG. 3, the noise of the tire 10a is measured while the vehicle 10 travels along the measuring zone 5 at different speeds of 72, 74, 76, 78, 80, 82, 84, 86 and 88 [km/h]. Such measurements provide 18 plots, as shown in FIG. 3. Further, from thus obtained 18 plots, a correlation equation is calculated to indicate the correlation between the speed of the vehicle 10 and the noise of the tire 10a. In addition, the noise of the tire 10a at the reference speed of 80 km/h is calculated from the calculated correlation equation. Thus, as shown in FIG. 3, the noise of the tire 10a at the reference speed of 80 km/h is calculated to be 70.3 dB.

Here, when the vehicle 10 travels once along the measuring zone 5 shown in FIG. 1, two plots "Left" and "Right" are obtained by the measuring devices 5R and 5L shown in FIG. 2. For example, when the vehicle 10 travels once along the measuring zone 5 shown in FIG. 1 at the speed of 80 km/h, two plots "Left" and "Right" at 80 km/h in FIG. 3 are obtained. This means that, if 18 plots are to be obtained as shown in FIG. 3, the vehicle 10 must travel 9 times round the test course 1 shown in FIG. 1, at respectively different speeds between 72 km/h and 88 km/h shown in FIG. 3.

There may arise increased difference between the Left plot and the Right plot at the same speed. This, for example, is due to the fact that, as seen in the width direction of the road surface 5a shown in FIG. 2, the distance from the vehicle 10 to the measuring device 5R is different from the distance from the vehicle 10 to the measuring device 5L. In this instance, the noise of the tire 10a measured by the measuring devices 5R and 5L shown in FIG. 2 cannot be used because of the low reliability of the data. Thus, in the tire noise test, it is necessary for the distance from the vehicle 10 to the measuring device 5R to be same as the distance from the vehicle 10 to the measuring device 5L in the width direction of the road surface 5a shown in FIG. 2. In other words, in the tire noise test, it is necessary for the vehicle 10 to travel along the vicinity of the center line O of the road surface 5a shown in FIG. 2.

[Function and Configuration of the Vehicle]

FIG. 4 is a block diagram showing an example of the vehicle 10 that may be used in the tire noise test method according to the embodiment of the present invention. The vehicle body 10 is provided on the vehicle body 10b with a prime mover 11, a transmission 12, a braking device 13, a steering device 14, a battery 15, a sensor unit 16, a communication unit 17, a memory unit 18, and a control unit 19.

The prime mover 11 provides rotational power for rotating the tire 10a. Examples of the prime mover 11 include a combustion engine, an electromotor, and a combination of a combustion engine and an electromotor. The combustion engine provides rotational power with fuel such as gasoline or light oil. The combustion engine may be, but is not limited to, a gasoline engine using gasoline as fuel, a diesel engine using light oil or the like as fuel, or the like. The electromotor provides rotational power by electric energy supplied from a power source including a storage battery, a fuel cell, or the like. However, the prime mover 11 may be any device capable of providing rotational power for rotating the tire 10a.

In the case of a gasoline engine, the prime mover 11 includes, for example, a fuel injection valve, a cylinder, a piston, a spark plug, a crankshaft, an intake manifold, intake valves, and the like. The intake valve is adapted to supply air to the cylinder via the intake manifold. The fuel injection valve is adapted to inject fuel into the cylinder via the intake manifold. When fuel and air are supplied to the cylinder, the piston compresses the fuel and air mixture in the cylinder. As the air-fuel mixture is compressed in the cylinder, the spark plug generates an electric spark to explode and burn the air-fuel mixture compressed in the cylinder. As the fuel or air-fuel mixture explodes and burns in the cylinder, the crankshaft generates rotational power. This rotational power is transmitted to the tire 10a via the transmission 12.

In the case of a diesel engine, the prime mover 11 includes, for example, a fuel injection valve, a cylinder, a piston, a crankshaft, an intake valve, and the like. The intake valve is adapted to supply air to the cylinder. When the intake air is supplied into the cylinder, the piston compresses the air in the cylinder. As the air in the cylinder is compressed to a temperature above the ignition point, the fuel injection valve injects fuel into the cylinder to self-ignite the fuel. As the fuel self-ignites in the cylinder and explodes and burns, the crankshaft generates rotational power. This rotational power is transmitted to the tire 10a via the transmission 12.

The transmission 12 is provided in a path for transmitting rotational power between the prime mover 11 and the tire 10a. The transmission 12 shifts the rotational speed of the prime mover 11 based on the control of the control unit 19 and transmits it to the tire 10a. Further, the transmission 12 puts the tire 10a into a predetermined state based on the control of the control unit 19. The predetermined state includes a drive state capable of traveling forward, a reverse state capable of traveling backward, a neutral state in which the tire 10a is disengaged from the prime mover 11, and a parking lock state in which the tire 10a is restrained in a stopped state.

The braking device 13 includes a brake 13A and a brake 13B. The brake 13A is a brake for decelerating the vehicle 10. For example, the brake 13A is a hydraulic brake. The brake 13A serves to reduce the rotational speed of the tire 10a based on the control of the control unit 19. The brake 13B is a brake for stopping the vehicle 10. For example, the brake 13B is a mechanical brake. The brake 13B serves to stop the rotation of the tire 10a based on the control of the control unit 19.

The steering device 14 is adapted to adjust the steering angle of the tire 10a. By adjusting the steering angle of the tire 10a by means of the steering device 14, the traveling direction of the vehicle 10 is adjusted.

The battery 15 is, for example, in the form of a lithium ion battery. The battery 15 is adapted to supply electric power to the components in the vehicle 10. The battery 15 may include a main battery that supplies electric power to the prime mover 11 and the like, and an auxiliary battery that supplies electric power to the sensor unit 16 and the like. In this instance, the auxiliary battery may supply electric power to the components of the vehicle 10 after the prime mover 11 has been put into a non-driving state by the control unit 19, as described hereinafter.

The sensor unit 16 is adapted to detect information regarding the surrounding environment of the vehicle 10. The sensor unit 16 is adapted to output the detected information to the control unit 19. The sensor unit 16 includes, for example, at least one of a GPS (Global Positioning System), a speed sensor, an IMU (Inertial Measurement Unit), an obstacle sensor, a camera, and the like.

If the sensor unit 16 is configured to include a GPS, for example, it serves to detect the position of the vehicle 10. The sensor unit 16 then outputs the detected position of the vehicle 10 to the control unit 19.

If the sensor unit 16 is configured to include a speed sensor, for example, it serves to detect the speed of the vehicle 10. The sensor unit 16 then outputs the detected speed to the control unit 19.

If the sensor unit 16 includes an IMU, for example, the sensor unit 16 serves to detect the posture and acceleration of the vehicle 10. The sensor unit 16 then outputs the detected posture and acceleration to the control unit 19. The IMU may be configured to include an acceleration sensor and a gyro sensor.

If the sensor unit 16 includes an obstacle sensor, for example, the sensor unit 16 serves to detect an obstacle within a predetermined region, in the traveling direction of the vehicle 10. The obstacle sensor may be configured to include a laser. In this instance, the obstacle sensor detects the presence of an obstacle by projecting a laser beam in the traveling direction of the vehicle 10 and detecting the laser beam reflected by the obstacle.

If the sensor unit 16 includes a camera, for example, the sensor unit 16 serves to capture an image of the road surface on which the vehicle 10 travels. The sensor unit 16 then outputs the captured image to the control unit 19.

The communication unit 17 serves to wirelessly communicate with an external device. The communication unit 17 includes, for example, a wireless communication module corresponding to any appropriate wireless communication standards. Examples of the wireless communication standards include wireless LAN, 2G (2nd Generation), 3G (3rd Generation), 4G (4th Generation), LTE (Long Term Evolution), WiMAX (Worldwide Interoperability for Microwave Access) and PHS (Personal Handy-phone System). Further, the communication unit 17 may be configured to include a communication module corresponding to any appropriate standards for road-to-vehicle communication.

The memory unit 18 may be comprised of a semiconductor memory, a magnetic memory, or the like. The memory unit 18 serves to store various kinds of information and a program for operating the control unit 19. The memory unit 18 may also function as a work memory.

The memory unit 18 serves to store the map data of the test course 1 shown in FIG. 1. The map data may be three-dimensional data. The map data includes, for example, topographical information on the road surface on which the vehicle 10 can travel, position information regarding the positions P1 to P7, and position information regarding the center line O of the road surface 5a shown in FIG. 2. Further, the memory unit 18 serves to store the speed of the vehicle 10 for performing the tire noise measurement, that is, the speed of the vehicle 10 at the position P5 which is the starting point of the measuring zone 5 shown in FIG. 1. For example, the memory unit 18 is adapted to store nine different speeds between 72 km/h and 88 km/h, as shown in FIG. 3.

The control unit 19 is a processor that controls and manages the entire vehicle 10, including each functional block of the vehicle 10. The control unit 19 may be comprised of a processor, such as a CPU (Central Processing Unit) that executes a program defining a control procedure or a dedicated processor specialized in processing each function.

The control unit 19 is adapted to receive starting instruction for testing the tire noise from an external device, via the communication unit 17. The external device is comprised, for example, of a wireless communication device installed in an operation base station that is provided around the test course 1 shown in FIG. 1. When the control unit 19 receives the starting instruction, the vehicle 10 is located, for example, at the position P7 of the test course 1 shown in Fig.

Upon receipt of the starting instruction, the control unit 19 puts the prime mover 11 into a driving state. As an example of processing for putting a gasoline-fueled engine as the prime mover 11 into a driving state, the control unit 19 turns on the ignition. For example, turning on the ignition includes that the control unit 19 outputs a driving signal to the fuel injection valve of the prime mover 11 as an engine and causes the fuel injection valve to inject fuel into the cylinder or the intake manifold. Further, if the prime mover 11 is a gasoline engine, turning on the ignition includes that the control unit 19 supplies an electric current to the spark plug of the engine to generate electric spark by the spark plug, and to explode and burn fuel or mixing in the cylinder.

When the prime mover 11 is put into the driving state, the control unit 19 controls the transmission 12 to put the tire 10a into the driving state and automatically drives the vehicle 10. The control unit 19 then suitably controls the steering device 14 and the like, based on the detection results of the sensor unit 16 during the automatic driving of the vehicle 10.

After the automatic driving has been started, based on the detection result of the sensor unit 16, the control unit 19 serves to detect that the vehicle 10 enters into the speed maintenance zone 2 shown in FIG. 1. For example, based on the GPS detection results obtained by the sensor unit 16, the control unit 19 detects the position of the vehicle 10. Further, when the detected position of the vehicle 10 and the position P1 stored in the memory unit 18 substantially coincide with each other in the traveling direction of the vehicle 10, the control unit 19 allows the vehicle 10 to enter into the speed maintenance zone 2 shown in FIG. 1.

When the control unit 19 detects that the vehicle 10 is entering into the speed maintenance zone 2 shown in FIG. 1, the control unit 19 is operated to control so that the speed of the vehicle 10 is maintained at a constant speed. For example, the control unit 19 controls the vehicle 10 so as to travel along the outer side of the corner section of the speed maintenance zone 2 shown in FIG. 1, such that the speed of the vehicle 10 is maintained at a constant speed.

After the vehicle 10 enters the speed maintenance zone 2 shown in FIG. 1, the control unit 19 can detect that the vehicle 10 enters the acceleration zone 3 shown in FIG. 1 based on the detection results of the sensor unit 16. For example, the control unit 19 detects the position of the vehicle 10 based on the detection results of the GPS included in the sensor unit 16. Further, when the detected position of the vehicle 10 and the position P2 stored in the memory unit 18 substantially coincide with each other in the traveling direction of the vehicle 10, the control unit 19 detects that the vehicle 10 is entering the acceleration zone 3 shown in FIG. 1. When the control unit 19 detects that the vehicle 10 is entering the acceleration zone 3 shown in FIG. 1, the control unit 19 suitably controls the prime mover 11 and the like to accelerate the vehicle 10, for example, at a predetermined acceleration rate.

The control unit 19 puts the prime mover 11 into a non-driving state when the vehicle 10 arrives at a predetermined position or reaches a predetermined speed while the vehicle 10 is accelerating. As an example of the process of putting the prime mover 11 into a non-driving state, if the prime mover 11 is a combustion engine, the control unit 19 turns off the ignition. For example, turning off the ignition includes that the control unit 19 outputs a stop signal to the fuel injection valve of the prime mover 11. Further, when the prime mover 11 is a gasoline engine, turning off the ignition includes that the control unit 19 stops the electric power supply to the spark plug. In the present disclosure, even after the prime mover 11 has been put into a non-driving state, the battery 15 supplies electric power to the components of the vehicle 10 except the prime mover 11.

Here, the predetermined position is, for example, the position P3 shown in FIG. 1. For putting the prime mover 11 into a non-driving state based on the arrival of the vehicle 10 at a predetermined position, the control unit 19 first detects the position of the vehicle 10 based on the detection results of the GPS included in the sensor unit 16. The control unit 19 then puts the prime mover 11 into non-driving state when the detected position of the vehicle 10 and the position P3 stored in the memory unit 18 substantially coincide with each other in the traveling direction of the vehicle 10. The control unit 19 may put the prime mover 11 into the non-driving state at a time point of arrival at the position P3 or may put the prime mover 11 into the non-driving state before arriving at the position P3. When the control unit 19 does not determine that the detected position of the vehicle 10 and the position P3 stored in the memory unit 18 substantially coincide with each other, that is, when the vehicle 10 has not reached the position P3, the control unit 19 sets the vehicle 10 to continue acceleration.

Further, the predetermined speed is the speed calculated based on the speed of the vehicle 10 to be subjected to the noise measurement of the tire 10a. For example, the predetermined speed is calculated by adding the speed of the vehicle 10 at the position P5 which is the starting point of the measurement zone 5 shown in FIG. 1, and the speed amount (hereinafter, also referred to as "speed reduction amount") of the vehicle 10 that has been decreased while the vehicle 10 travels from the position P3 to the position P5 shown in FIG.

1. The details of the calculation method of the predetermined speed will be described hereinafter. For putting the prime mover 11 into a non-driving state based when the vehicle 10 reaches a predetermined speed, the control unit 19 first detects the speed of the vehicle 10 based on the detection results of the speed sensor included in the sensor unit 16. Further, the control unit 19 puts the prime mover 11 into non-driving state when the detected speed of the vehicle 10 reaches a predetermined speed.

When the prime mover 11 is put into a non-driving state, the control unit 19 controls the transmission 12 to put the tire 10a in a neutral state of disconnecting the tire 10a from the prime mover 11 and causes the vehicle 10 to coast. By such control, the vehicle 10 coasts in the coast-traveling zone 4 shown in FIG. 1. Further, in the measuring section 5 in the coast-traveling zone 4, the vehicle 10 puts the prime mover 11 in a non-driving state, so that the noise of the vehicle 10 generated from other than the tire 10a is reduced. By such control, the measuring devices 5R and 5L shown in FIG. 2 can accurately collect the noise of the tire 10a.

The control unit 19 may calculate the speed reduction amount in order to calculate the predetermined speed to be used for the next tire noise measurement during the coast-traveling along the coast-traveling zone 4 shown in FIG. 1. As an example of the calculation of the speed reduction amount, first, the control unit 19 detects the speed of the vehicle 10 at the point P2 shown on FIG. 1, where the coast-traveling is started, based on the detection results of the GPS and the speed sensor included in the sensor unit 16. The control unit 19 then detects the speed of the vehicle 10 at the position P5 shown in FIG. 1, which is the starting point of the measurement zone 5, based on the detection results of the GPS and the speed sensor included in the sensor unit 16. Further, the control unit 19 calculates the speed reduction amount by subtracting the speed at the position P5 shown in FIG. 1 from the speed at the position P3 shown in FIG. 1. For example, the control unit 19 calculates the speed reduction amount by the following Equation (1);

$$VR = VP3 - VP5 \qquad (1)$$

wherein, VR is the speed reduction amount, VP3 is the speed of the vehicle 10 at the position P3 shown in FIG. 1, and VP5 is the speed of the vehicle 10 at the position P5 shown in FIG. 1. The control unit 19 stores the calculated speed reduction amount in the memory unit 18.

The control unit 19 carries out a control during the coast-traveling so that, as seen in the width direction of the road surface 5a shown in FIG. 2, the distance between the vehicle 10 and the measuring device 5R shown in FIG. 2 and the distance between the vehicle 10 and the measuring device 5L are equal to each other. The details of this processing will be described below with reference to [Processing Example 1 during Coast-traveling]. Further, when the control unit 19 detects an obstacle present within a predetermined area in the traveling direction of the vehicle 10 during the coast-traveling, the control unit 19 decelerates the vehicle 10. The details of this processing will be described below with reference to [Processing Example 2 during Coast-traveling].

The control unit 19 during the coast-traveling can detect that the vehicle 10 arrives at the position P4 shown in FIG. 1, based on the detection results of the sensor unit 16. For example, the control unit 19 detects the position of the vehicle 10 based on the detection results of the GPS included in the sensor unit 16. Further, when the detected position of the vehicle 10 and the position P4 stored in the memory unit 18 substantially coincide with each other in the traveling direction of the vehicle 10, the control unit 19 detects that the vehicle 10 reached the position P4 shown in FIG. 1. When the vehicle 10 arrives at the position P4 which is the end point of the coast-traveling zone 4 shown in FIG. 1, the control unit 19 puts the prime mover 11 into the driving state again. When the prime mover 11 is put into the driving state again, the control unit 19 controls the transmission 12 to put the tire 10a into the driving state and automatically drive the vehicle 10. By such control, the vehicle 10 automatically travels along the cruising zone 6 shown in FIG. 1.

The control unit 19 may feedback the measurement results during the automatic operation in the cruising zone 6 shown in FIG. 1. As an example of such feedback, the control unit 19 may calculate the predetermined speed to be used in the next tire noise measurement.

As an example of calculating the predetermined speed, first, the control unit 19 extracts from the memory unit 18 one speed at which the noise measurement of the tire 10a has not yet been performed. This extracted speed may be the (predetermined) speed of the vehicle 10 at the position P5, which is the starting point of the measuring zone 5 shown in FIG. 1, for the next tire noise measurement. Next, the control unit 19 adds the extracted speed of the vehicle 10 and the current speed reduction amount stored in the memory unit 18, to calculate a predetermined speed to be used for the next tire noise measurement. For example, the control unit 19 calculates the predetermined speed to be used for the next tire noise measurement, based on the following Equation (2):

$$VNP3 = VNP5 + VR \qquad (2)$$

wherein, VNP3 is a predetermined speed used for the next tire noise measurement, VNP 5 is the speed extracted by the control unit 19, for which the noise measurement of the tire 10a has not yet been performed, i.e., VNP 5 may be the speed of the vehicle 10 for the next tire noise measurement, at the position P5 that is the starting point of the measuring zone 5 shown in FIG. 1, and VR is the speed reduction amount calculated by the above Equation (1).

In the above example of calculation of the predetermined speed, the control unit 19 calculates the acceleration rate of the vehicle 10 in the acceleration zone 3 shown in FIG. 1, so that the speed of the vehicle 10 upon the next tire noise measurement becomes the calculated predetermined speed at the position P3 shown in FIG. 1. By such control, in the next tire noise measurement, the speed of the vehicle 10 can reach the predetermined speed when the vehicle 10 arrives at the position P3 shown in FIG. 1.

Here, the speed reduction amount may be generated due to friction between the tire 10a and the road surface. The surface shape of the tire 10a varies depending on the type of the tire 10a. Thus, the speed reduction amount may change depending upon the type of the tire 10a. Even in such a case, according to the present embodiment, the predetermined speed can be automatically calculated depending upon the type of the tire 10a, under the control by means of the control unit 19 described above. By such control, according to the present embodiment, the tire noise test can be efficiently executed. Further, by such control, the noise of the tire 10a at a desired speed can be measured.

Processing Example 1 During Coast-Traveling

Next, explanation will be made of Processing Example 1 of the control unit 19 during the coast-traveling.

The control unit 19 carries out a control during the coast-traveling so that, as seen in the width direction of the road surface 5a shown in FIG. 2, the distance between the vehicle 10 and the measuring device 5R shown in FIG. 2 and the distance between the vehicle 10 and the measuring device 5L shown in FIG. 2 are equal to each other. As an example of such control, the control unit 19 may control the vehicle 10 to travel near the center of the road surface 5a in the measurement zone 5 shown in FIG. 2. Hereinafter, this control example will be described.

During the coast-traveling, the control unit 19 determines whether or not the distance from the center line O of the road surface 5a to the vehicle 10 is within a predetermined range in the width direction of the road surface 5a shown in FIG. 2. For example, first, the control unit 19 detects the position of the vehicle 10 based on the detection results of the GPS included in the sensor unit 16. The control unit 19 then acquires the position of the center line O of the road surface 5a shown in FIG. 2 from the memory unit 18. The control unit 19 further determines whether or not the distance from the center line O of the road surface 5a to the vehicle 10, as seen in the width direction of the road surface 5a shown in FIG. 2, is within a predetermined range, based on the detected position of the vehicle 10 and the acquired position of the center line O. The predetermined range may be set based on the distance between the measuring devices 5R and 5L shown in FIG. 2.

If the control unit 19 does not determine that the distance from the center line O of the road surface 5a to the vehicle 10 is within a predetermined range, the control unit 19 controls the steering device 14 to adjust the steering angle of the tire 10a according to that distance. By such control, the vehicle 10 according to the present embodiment can travel more accurately near the center of the road surface 5a than, for example, when the driver actually drives the vehicle 10. Since the vehicle 10 travels near the center of the road surface 5a with high accuracy, the measuring devices 5R and 5L shown in FIG. 2 can measure the noise of the tire 10a with higher accuracy.

Processing Example 2 During Coast-Traveling

Next, explanation will be made of Processing Example 2 of the control unit 19 during the coast-traveling.

The control unit 19 determines whether or not an obstacle is present within a predetermined region in the traveling direction of the vehicle 10, based on the detection result of the obstacle sensor included in the sensor unit 16. When the control unit 19 determines that an obstacle is present within the predetermined region in the traveling direction of the vehicle 10, the control unit 19 controls the brake 13A to decelerate the vehicle 10. While the vehicle 10 is decelerating, if the obstacle is an animal, for example, it would be possible for the animal to escape away from the vehicle 10. By such control, the safety of the vehicle 10 during the coast-traveling can be ensured. When the control unit 19 determines that an obstacle is present within the predetermined region in the traveling direction of the vehicle 10, the control unit 19 may also control the brakes 13A and 13B to stop the vehicle 10.

The control unit 19 also determines whether or not abnormal situation has occurred in the vehicle 10. An example of abnormal situation in the vehicle 10 is failure of a component related to the travelling of the vehicle 10 (e.g., the steering device 14). Upon occurrence of abnormal situation in the vehicle 10, it may not be possible for the vehicle 10 to maintain the automatic driving. Thus, when the control unit 19 detects occurrence of abnormal situation in the vehicle 10, the control unit 19 controls the brake 13A to decelerate the vehicle 10. The control unit 19 further controls the brake 13B to stop the vehicle 10. By such control, the safety of the vehicle 10 during the coast-traveling can be more reliably ensured.

[Operation of the Vehicle]

Figure 5:
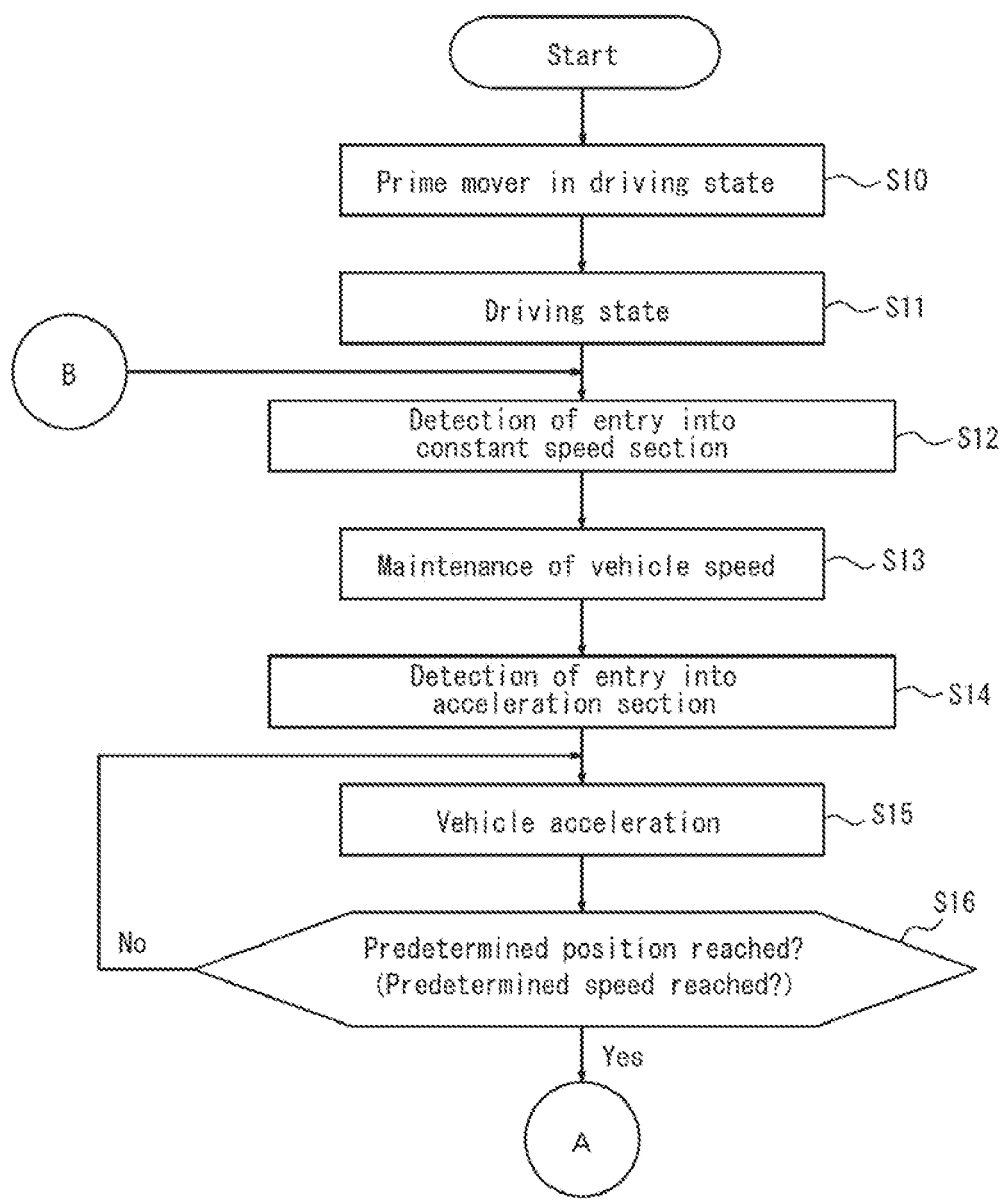
FIG. 5 is a flowchart showing the procedures of the tire noise test method according to one embodiment of the invention (Flow 1).
Figure 6:
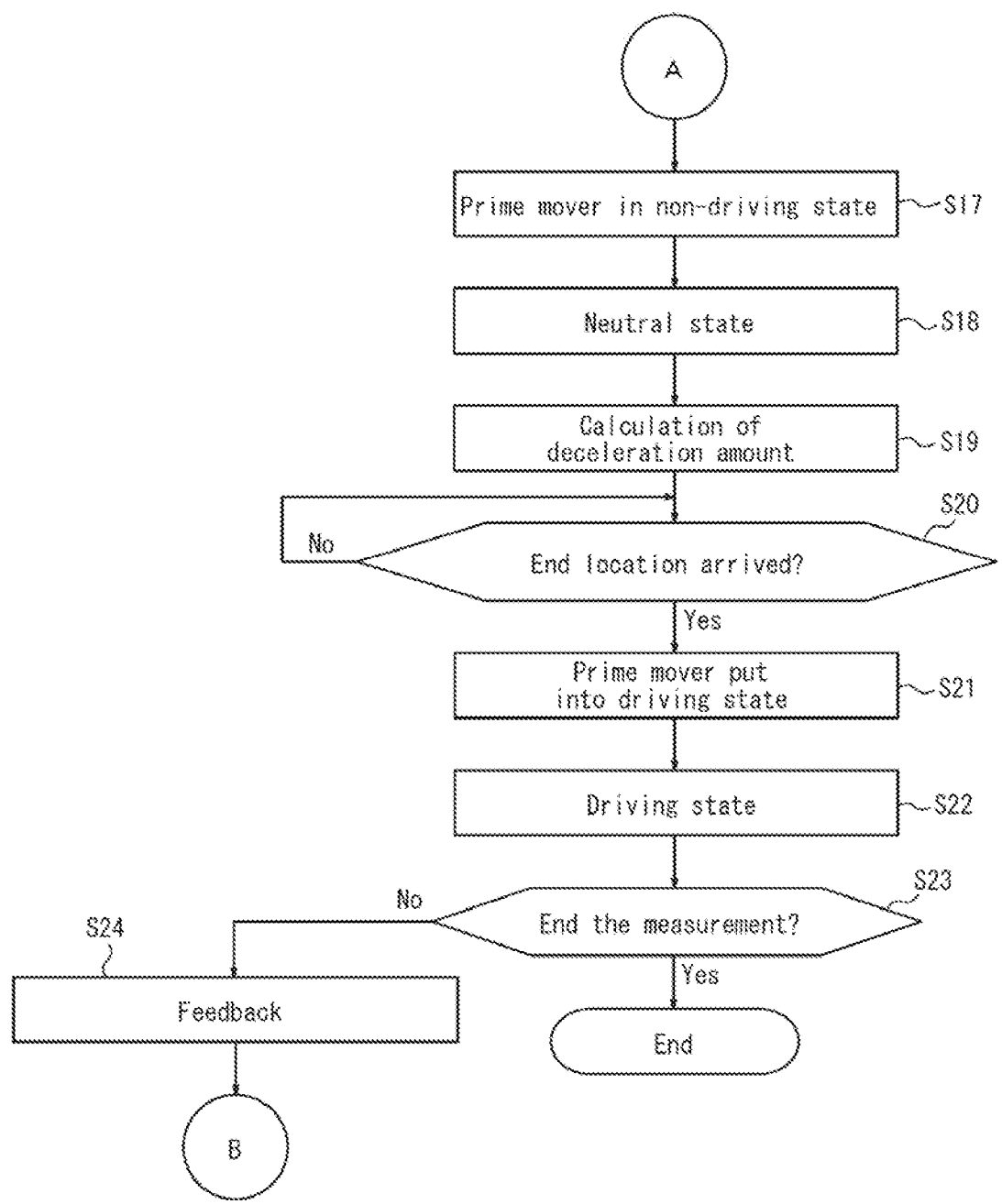
FIG. 6 is a flowchart showing the procedures of the tire noise test method according to one embodiment of the invention (Flow 2).

FIG. 5 is a flowchart showing the process flow of the tire noise test method according to an embodiment of the invention (Flow No. 1). FIG. 6 is a flowchart showing the process flow of the tire noise test method according to the embodiment of the present invention (Flow No. 2). For example, when the control unit 19 receives the test starting instruction from an external device via the communication unit 17, the control unit 19 starts the process shown in FIG. 5. The vehicle 10 is located at the position P7 of the test course 1 shown in FIG. 1 at the start of the process shown in FIG. 5.

The control unit 19 puts the prime mover 11 into a driving state (step S10). When the prime mover 11 is put into the driving state, the control unit 19 controls the transmission 12 to put the tire 10a into the driving state (step S11), thereby allowing an automatic driving of the vehicle 10.

The control unit 19 detects that the vehicle 10 enters the speed maintenance zone 2 shown in FIG. 1 (step S12). When the control unit 19 detects that the vehicle 10 enters the speed maintenance zone 2, the control unit 19 carries out a control to maintain the speed of the vehicle 10 at a constant speed (step S13).

The control unit 19 detects that the vehicle 10 enters the acceleration zone 3 shown in FIG. 1 (step S14). When the control unit 19 detects that the vehicle 10 enters the acceleration zone 3, the control unit 19 appropriately controls the prime mover 11 and the like to accelerate the vehicle 10 (step S15).

Based on the detection results of the sensor unit 16, the control unit 19 determines whether or not the vehicle 10 reaches the position P3 shown in FIG. 1 as a predetermined position (step S16). If the control unit 19 determines that the vehicle 10 reaches the position P3 shown in FIG. 1 as the predetermined position (step S16: Yes), the control unit 19 proceeds to the process of step S17 shown in FIG. 6. On the other hand, if the control unit 19 does not determine that the vehicle 10 reaches the position P3 shown in FIG. 1 as the predetermined position (step S16: No), the control unit 19 returns to the process of step S15.

In the process of step S17 shown in FIG. 6, the control unit 19 puts the prime mover 11 into a non-driving state. When the prime mover 11 is put into the non-driving state, the control unit 19 controls the transmission 12 to put the tire 10a into the neutral state (step S18), thereby allowing the coast-traveling of the vehicle 10. By such control, the vehicle 10 coasts in the coast-traveling zone 4 shown in FIG. 1.

During the coast-traveling, the control unit 19 calculates the speed reduction amount (step S19) based, for example, on Equation (1) above, and stores it in the memory unit 18. Further, while the vehicle 10 is traveling in the measuring zone 5 shown in FIG. 1, the noise generated by the tire 10a is collected by the measuring devices 5R and 5L shown in FIG. 2.

Based on the detection results of the sensor unit 16, the control unit 19 determines whether or not the vehicle 10 reaches the position P4, which is the end point of the coast-traveling zone 4 shown in FIG. 1 (step S20). If the control unit 19 determines that the vehicle 10 reaches the position P4 which is the end point of the coast-traveling zone 4 shown in FIG. 1 (step S20: Yes), the control unit 19 proceeds to the process of step S21. On the other hand, if it is not determined that the vehicle 10 reaches the position P4 which is the end point of the coast-traveling zone 4 shown in FIG. 1 (step S20: No), the control unit 19 performs the process of step S20 again.

In the process of step S21, the control unit 19 puts the prime mover 11 into the driving state. When the prime mover 11 is put into the driving state, the control unit 19 controls the transmission 12 to put the tire 10a into the driving state (step S22), thereby allowing the vehicle 10 to travel automatically. By such control, the vehicle 10 travels automatically the cruising zone 6 shown in FIG. 1.

The control unit 19 determines whether or not to end the test (step S23). For example, the control unit 19 determines that the test has been completed when it is determined that the noise measurement of the tire 10a has been performed at each speed stored in the memory unit 18. If the control unit 19 determines that the test has been completed (step S23: Yes), the control unit 19 ends the processes shown in FIGS. 5 and 6. On the other hand, if the control unit 19 does not determine that the test has been completed (step S23: No), the control unit 19 proceeds to the process of step S24.

In the process of step S24, the control unit 19 feeds back the measurement results. For example, the control unit 19 may calculate a predetermined speed to be used in the process of the next step S16 shown in FIG. 5, based on the above Equation (2) and the speed reduction amount calculated in the process of step S19. In other words, the control unit 19 may calculate the predetermined speed for the next tire noise test method, based on the above Equation (2) and the speed reduction amount calculated when the one tire noise test method has been carried out. In this instance, in the process of the next step S16 shown in FIG. 5, the control unit 19 may determine whether or not the speed of the vehicle 10 reaches a predetermined speed based on the detection results of the sensor unit 16. In the process of the next step S16 shown in FIG. 5, if the control unit 19 determines that the speed of the vehicle 10 reaches the predetermined speed (step S16: Yes), the control unit 19 proceeds to the process of step S17 shown in FIG. 6. On the other hand, if the control unit 19 does not determine that the speed of the vehicle 10 reaches the predetermined speed in the process of the next step S16 shown in FIG. 5 (step S16: No), the control unit 19 returns to the process of step S15 shown in Fig.

The control unit 19 may determine whether or not the vehicle 10 reaches the predetermined speed in the first process of the step S16 shown in FIG. 5. In this instance, if the control unit 19 determines that the vehicle 10 reaches the predetermined speed (step S16: Yes), the control unit 19 proceeds to the process of step S17 shown in FIG. 6. On the other hand, if the control unit 19 does not determine that the vehicle 10 reaches the predetermined speed (step S16: No), the control unit 19 returns to the process of step S15 shown in FIG. 5.

Operation Example 1 During the Coast-Traveling

Figure 7:
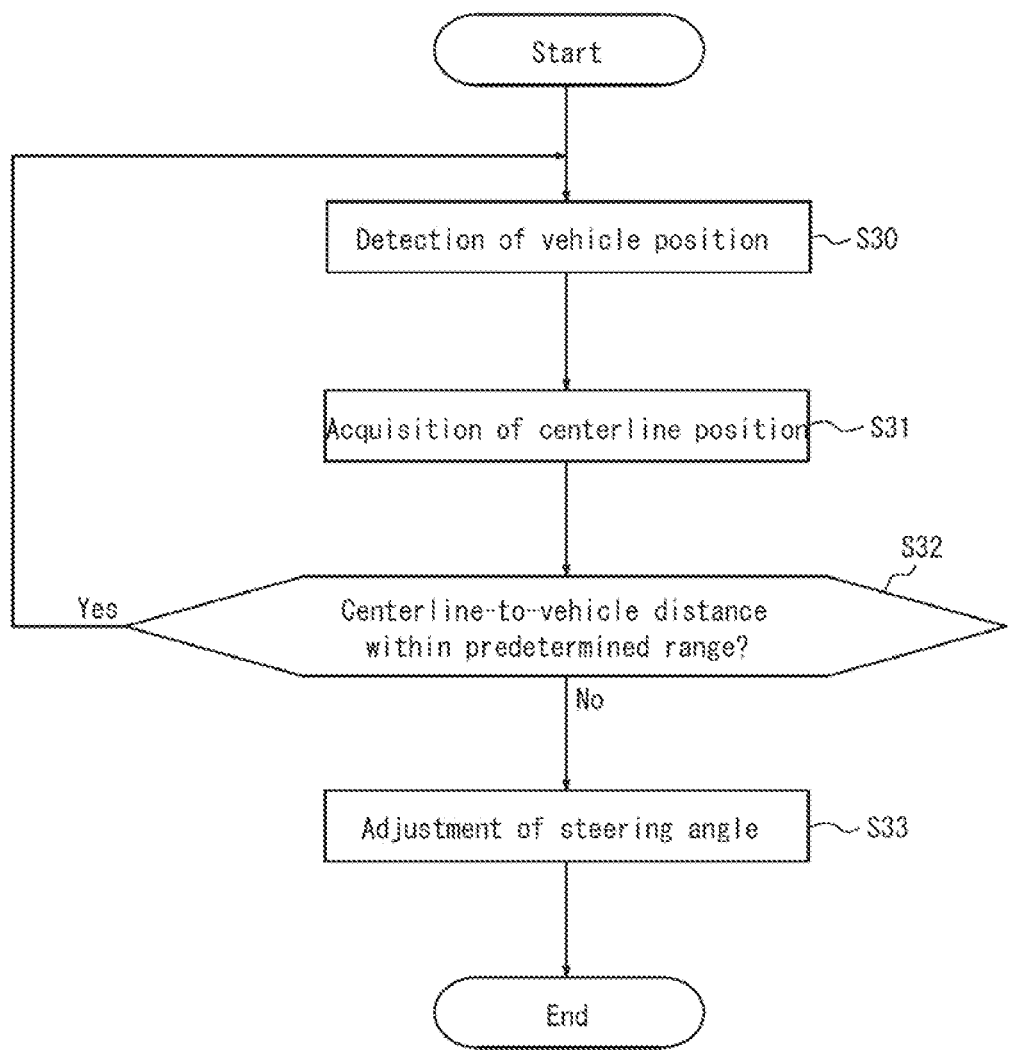
FIG. 7 is a flowchart showing an operation example 1 during the coast-traveling of the vehicle in the tire noise test method according to one embodiment of the invention.

FIG. 7 is a flowchart showing an operation example 1 during the coast-traveling of the vehicle 10 in the tire noise test method according to the embodiment of the present invention. For example, the control unit 19 starts the process shown in FIG. 7 after execution of the process of step S18 shown in FIG. 6. Further, the control unit 19 ends the process shown in FIG. 7 before execution of the process of step S21 shown in FIG. 6.

The control unit 19 detects the position of the vehicle 10 based on the detection results of the GPS included in the sensor unit 16 (step S30). Further, the control unit 19 acquires the position of the center line O of the road surface 5a shown in FIG. 2, from the memory unit 18 (step S31).

The control unit 19 determines whether or not the distance from the center line O of the road surface 5a to the vehicle 10 is within a predetermined range in the width direction of the road surface 5a shown in FIG. 2 (step S32). If the control unit 19 determines that the distance from the center line O of the road surface 5a to the vehicle 10 is within a predetermined range (step S32: Yes), the control unit 19 returns to the process of step S30. On the other hand, if the control unit 19 does not determine that the distance from the center line O of the road surface 5a to the vehicle 10 is within a predetermined range (step S32: No), the control unit 19 proceeds to the process of step S33.

In the process of step S33, the control unit 19 controls the steering device 14 to adjust the steering angle of the tire 10a according to the distance from the center line O of the road surface 5a to the vehicle 10. The control unit 19 returns to the process of step S30 after the process of step S33.

Operation Example 2 During the Coast-Traveling

Figure 8:
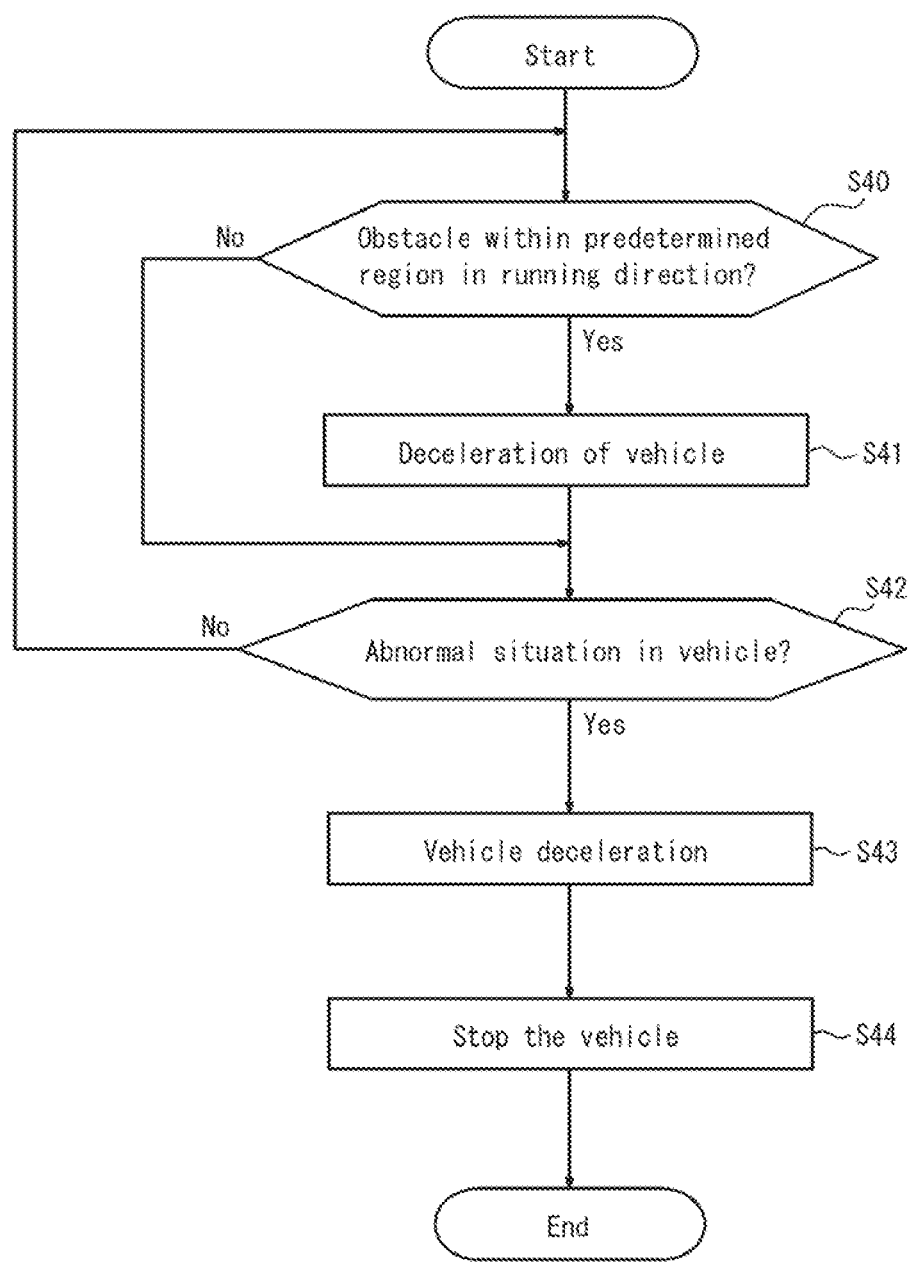
FIG. 8 is a flowchart showing an operation example 2 during the coast-traveling of the vehicle in the tire noise test method according to one embodiment of the invention.

FIG. 8 is a flowchart showing an operation example 2 during the coast-traveling of the vehicle 10 in the tire noise test method according to the embodiment of the present invention. For example, the control unit 19 starts the process shown in FIG. 8 after execution of the process of step S18 shown in FIG. 6. Further, the control unit 19 ends the process shown in FIG. 8 before execution of the process of step S21 shown in FIG. 6. The control unit 19 may execute the process shown in FIG. 8 in parallel with the process shown in FIG. 7.

The control unit 19 determines whether or not an obstacle is present within a predetermined region in the traveling direction of the vehicle 10, based on the detection results of the obstacle sensor included in the sensor unit 16 (step S40). If the control unit 19 determines that an obstacle is present within the predetermined region in the traveling direction of the vehicle 10 (step S40: Yes), the control unit 19 proceeds to the process of step S41. On the other hand, if the control unit 19 does not determine that an obstacle is present within the predetermined region in the traveling direction of the vehicle 10 (step S40: No), the control unit 19 proceeds to the process of step S42.

In the process of step S41, the control unit 19 controls the brake 13A to decelerate the vehicle 10. While the vehicle 10 is decelerating, if the obstacle is an animal, for example, it would be possible for the animal to escape away from the vehicle 10.

In the process of step S42, the control unit 19 determines whether or not abnormal situation has occurred in the vehicle 10. If the control unit 19 determines that abnormal situation has occurred in the vehicle 10 (step S42: Yes), the control unit 19 proceeds to the process of step S43. On the other hand, if the control unit 19 does not determine that abnormal situation has occurred in the vehicle 10 (step S42: No), the control unit 19 returns to the process of step S40.

In the process of step S43, the control unit 19 controls the brake 13A to decelerate the vehicle 10. Further, the control unit 19 controls the brake 13B to stop the vehicle 10 (step S44).

The control unit 19 may control the brakes 13A and 13B to stop the vehicle 10 in the process of step S41.

As described above, in the test method for the tire 10a according to the present embodiment, when the vehicle 10 arrives at the position P3 shown in FIG. 1 as a predetermined position or reaches the predetermined speed, the prime mover 11 is put into a non-driving state. By such control, it is possible to provide an efficient tire noise test method in the actual vehicle noise test, as described below.

For a comparative example, it is assumed that the driver drives the vehicle 10 and performs a tire noise test. In the comparative example, it is further assumed that the prime mover 11 is a combustion engine that uses gasoline as fuel. In the comparative example, it is required for the driver to determines that the vehicle 10 reaches the position P3 by visually recognizing the position P3 shown in FIG. 1, or to determine that the vehicle 10 reaches a predetermined speed while the driver visually recognizes the speedometer of the vehicle 10. That is, in the comparative example, the driver determines when to turn off the ignition. Thus, in the comparative example, it may not be possible to turn off the ignition at the correct timing. If the ignition cannot be turned off at the correct timing, the tire noise test cannot be performed efficiently.

On the other hand, in the present embodiment, the control unit 19 of the vehicle 10 determines whether the vehicle 10 reaches the position P3 or the predetermined speed. By such control, according to the present embodiment, the ignition can be turned off at an accurate timing, and the tire noise test can be efficiently executed.

Further, in the comparative example, it is required to train the driver. In the comparative example, since training of the driver is required, it may be inevitable that the cost of performing the tire noise test increases.

In contrast, according to the present embodiment, it is not necessary to train the driver. Thus, according to the present embodiment, it is possible to suppress increase in cost for carrying out the tire noise test as compared to the comparative example.

The tire noise test method according to the present invention is not limited to the specific configurations shown in the above-described embodiments, and variations and modifications may be made without departing from the scope of claims.

Figure 9:
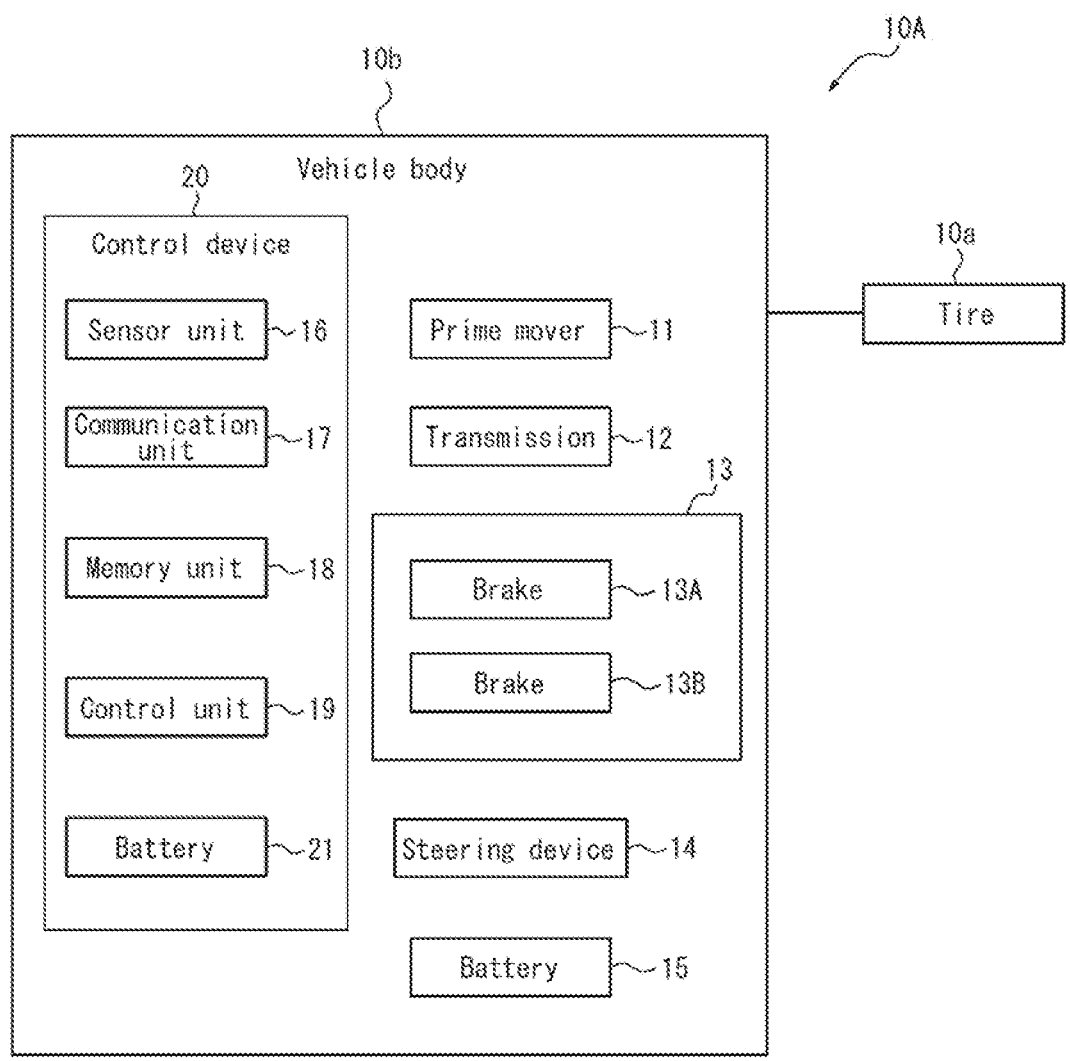
FIG. 9 is a block diagram showing an example of the control unit in the tire noise test method according to one embodiment of the invention.

In the above embodiment, the tire noise test method has been described as being executed by the vehicle 10. However, a device different from the vehicle 10 may be used for allowing the tire noise test method to be carried out by the vehicle 10. FIG. 9 shows an example of the control device 20 in the tire noise test method according to the embodiment of the present invention. The vehicle 10A shown in FIG. 9 includes a control device 20. The control device 20 may automatically drive the vehicle 10A to carry out the tire noise test. The control device 20 shown in FIG. 9 includes a sensor unit 16, a communication unit 17, a memory unit 18, a control unit 19, and a battery 21. The battery 21 is, for example, a lithium ion battery. The battery 21 supplies power to the components in the control device 20. When the vehicle 10A reaches a predetermined position or reaches a predetermined speed, the control unit 19 of the control device 20 shown in FIG. 9 causes the vehicle 10A to coast in a non-driving state of the prime mover 11 of the vehicle 10A.

In the above embodiment, the tire noise test method has been described as being carried out by the control unit 19 included in the vehicle 10. However, the tire noise test method by the vehicle 10 may be carried out based on the instruction from another control device arranged outside the vehicle 10. In this instance, the control unit 19 of the vehicle 10 carries out the tire noise test method based on the instruction from another control device arranged outside the vehicle 10, via the communication unit 17.

In the above embodiment, the vehicle 10 has been described as including the control unit 19. However, in addition to the control unit 19, the vehicle 10 may also include an auxiliary control unit for monitoring the control unit 19. In this instance, the auxiliary control unit may determine whether or not abnormal situation has occurred in the vehicle 10 while the vehicle 10 is coast-traveling. Further, if the auxiliary control unit detects occurrence of abnormal situation in the vehicle 10, the auxiliary control unit may control the brakes 13A and 13B to stop the vehicle 10. By such control, the safety of the vehicle 10 can be ensured even upon occurrence of abnormality in the control unit 19.

In the above embodiment, the control unit 19 has been described an example of detecting the position of the vehicle 10 based on the detection results of the GPS included in the sensor unit 16. However, the detection results of the sensor unit 16 for detecting the position of the vehicle 10 are not limited to the detection results of the GPS sensor. For example, the control unit 19 may detect the position of the vehicle 10 based on the combination of the detection results of any component included in the sensor unit 16 or the detection results of any component.

In the above embodiment, an example of detecting the position of the vehicle 10 based on the detection results of the sensor unit 16 has been described. However, the method of detecting the position of the vehicle 10 is not limited to this. For example, the control unit 19 may detect the position of the vehicle 10 by road-to-vehicle communication. The road-to-vehicle communication is a two-way communication between the vehicle 10 and the communication device installed in the test course 1 shown in FIG. 1. In this example, by communicating with the communication device at the position P3 shown in FIG. 1, via the communication unit 17, the control unit 19 may detect that the position of the vehicle 10 is the position P3.

In the above embodiment, the tire noise test defined by ECE R117 has been referred to as an example of the tire noise test standard. However, the tire noise test method of the present disclosure may be used for a tire noise test of any standard.

INDUSTRIAL APPLICABILITY

According to the present invention, it is possible to provide a tire noise test method, a vehicle and a control device that are efficient in actual vehicle noise test.

REFERENCE NUMERALS

1: Test course
2: Speed maintenance zone
3: Acceleration zone
4: Coast-traveling zone
5: Measuring zone
5a: Road surface
5R, 5L: Measuring device
6: Cruising zone
10, 10A: Vehicle
10a: Tire
10b: Vehicle body
11: Prime mover
12: Transmission
13, 13A, 13B: Braking device 14: Steering device
15: Battery
16: Sensor unit
17: Communication unit
18: Memory unit
19: Control unit

The invention claimed is:

1. A tire noise test method to be conducted while a vehicle is driven automatically, comprising:
operating a control unit including at least one processor when the vehicle reaches a predetermined position or reaches a predetermined speed, for putting the vehicle into coast-traveling with a prime mover of the vehicle in a non-driving state;
operating a measuring unit for measuring tire noise during the coast-traveling of the vehicle;
operating the control unit to subtract a vehicle speed at a starting point of a tire noise measuring zone, from a vehicle speed at the time point of starting the coast-traveling, thereby calculating a speed reduction amount when a first tire noise test has been conducted; and
operating the control unit to add a preset speed at the start point of the zone for measuring the tire noise in a next tire noise test and said speed reduction amount, thereby to calculate the predetermined speed for a next tire noise test.

2. The tire noise testing method according to claim 1, further comprising:
arranging two measuring units on both sides in a width direction of a road surface for the vehicle to travel thereon; and
operating the control unit to control a position of the vehicle during the coast-traveling so that distances between the vehicle and the two measuring units are equal to each other.

3. The tire noise test method according to claim 2, wherein the operating the control unit comprises:
operating the control unit to determine whether or not the distance from a center line in the width direction of the road surface to the vehicle, in the width direction of the road surface, is within a predetermined range during the coast-traveling, and
operating the control unit to determine a steering angle of the tire of the vehicle according to the distance from said center line to the vehicle, when the control unit determines that the distance is not within the predetermined range.

4. The tire noise test method according to claim 3, further comprising:
operating the control unit to decelerate or stop the vehicle during the coast-traveling, upon detection of presence of an obstacle within a predetermined region in the travelling direction of the vehicle.

5. The tire noise test method according to claim 3, further comprising:
operating the control unit to control a braking device of the vehicle and thereby to stop the vehicle, upon detection of occurrence of abnormal situation in the vehicle during the coast-traveling.

6. The tire noise test method according to claim 2, further comprising:
operating the control unit to decelerate or stop the vehicle during the coast-traveling, upon detection of presence of an obstacle within a predetermined region in the travelling direction of the vehicle.

7. The tire noise test method according to claim 6, further comprising:
operating the control unit to control a braking device of the vehicle and thereby to stop the vehicle, upon detection of occurrence of abnormal situation in the vehicle during the coast-traveling.

8. The tire noise test method according to claim 2, further comprising:
operating the control unit to control a braking device of the vehicle and thereby to stop the vehicle, upon detection of occurrence of abnormal situation in the vehicle during the coast-traveling.

9. The tire noise test method according to claim 1, further comprising:
operating the control unit to decelerate or stop the vehicle during the coast-traveling, upon detection of presence of an obstacle within a predetermined region in the travelling direction of the vehicle.

10. The tire noise test method according to claim 9, further comprising:
operating the control unit to control a braking device of the vehicle and thereby to stop the vehicle, upon detection of occurrence of abnormal situation in the vehicle during the coast-traveling.

11. The tire noise test method according to claim 1, further comprising:
operating the control unit to control a braking device of the vehicle and thereby to stop the vehicle, upon detection of occurrence of abnormal situation in the vehicle during the coast-traveling.

12. A vehicle adapted for conducting a tire noise test during an automatic driving of the vehicle, comprising:
a prime mover; and
a control unit including at least one processor configured to, when the vehicle reaches a predetermined position or reaches a predetermined speed, put the vehicle into coast-traveling with the prime mover in a non-driving state,
wherein the control unit is further configured to:
subtract a vehicle speed at a starting point of a tire noise measuring zone, from a vehicle speed at the time point of starting the coast-traveling, thereby calculating a speed reduction amount when a first tire noise test has been conducted; and
add a preset speed at the start point of the zone for measuring the tire noise in a next tire noise test and said speed reduction amount, thereby to calculate the predetermined speed for a next tire noise test.

13. A control device configured to automatically drive a vehicle and carrying out a tire noise test, wherein:
the control device includes at least one processor and is configured to, when the vehicle reaches a predetermined position or reaches a predetermined speed, put the vehicle into coast-traveling with a prime mover of the vehicle in a non-driving state,
wherein the control device is further configured to:
subtract a vehicle speed at a starting point of a tire noise measuring zone, from a vehicle speed at the time point of starting the coast-traveling, thereby calculating a speed reduction amount when a first tire noise test has been conducted; and
add a preset speed at the start point of the zone for measuring the tire noise in a next tire noise test and said speed reduction amount, thereby to calculate the predetermined speed for a next tire noise test.

* * * * *